Inventor:
Louis Marcel Musé
By Baldwin & Wight
Attorneys

United States Patent Office 3,422,345
Patented Jan. 14, 1969

3,422,345
METHOD AND APPARATUS FOR MEASURING THE RATIO AND PHASE RELATION OF AN ELECTRIC FIELD TO A CORRELATED MAGNETIC FIELD
Louis Marcel Musé, Paris, France, assignor to Etablissement Public: Centre National de la Recherche Scientifique, Paris, France, a corporation of France
Filed Mar. 2, 1966, Ser. No. 531,240
Claims priority, application France, Mar. 5, 1965, 8,153
U.S. Cl. 324—1
Int. Cl. G01r 3/00
13 Claims

ABSTRACT OF THE DISCLOSURE

Improvements relating to the measuring of the ratio of telluric and magnetic fields which inherently exist in the earth, or of the ratio of two physical variables related in a manner similar to the relationship of telluric and magnetic fields. Two detecting and recording provisions are provided and a distortion generator is provided in at least one of the detecting and measuring provisions to provide essentially similar transfer functions in each of the detecting and recording provisions, whereby the outputs from both such provisions are simply related, for the easy determination of both phase and amplitude relationships between the detected variables.

---

The present invention relates to a measuring device, intended principally for use in magneto-telluric prospecting, where it is required to determine accurately the relations existing between the telluric and natural magnetic fields. It is moreover obvious that this measuring device may be applied in all cases where it is required to determine the relationships of amplitude and phase between any two physical magnitudes connected together by relations which are, for example, similar to those encountered in magneto-telluric prospecting, for example in physics and medicine (seismology, cardiology, and so on).

In order to define more clearly the framework of the invention, it is indispensable that the principles applied in magneto-telluric prospecting should first be recalled. It is known that natural electric currents, known as telluric currents, which circulate permanently in the ground undergo continuous fluctuations; it is known that the same is true of the terrestrial magnetic field. The fluctuations of telluric currents and those of the magnetic field however are not independent. It is well known that, at least in simple cases, the variations undergone by a horizontal component of the electric field and those undergone by the horizontal magnetic component which is orthogonal thereto are connected quantitatively by the equations of electromagnetism. As these relations depend on the electric resistivity of the subjacent soil, they make it possible to determine and hence to make known this resistivity.

The aforesaid magneto-telluric variations do not have the character of sinusoidal variations, but are of great complexity. It may however be considered that they result from the superimposition of sinusoidal variations of various periods. More precisely it may be said that the spectrum of the magnetic variations, and also that of the corresponding telluric variations are more or less continuous spectra, whence it is possible to extract almost any period T by means of appropriate electric filtration. In addition, it is found that because of skin effect, the shorter the period of the variations, the more the telluric currents will be concentrated in the proximity of the surface of the ground. The resistivity determined from the shortest periods of the spectrum is therefore that of the superficial layers. Inversely, considering increasingly longer periods, the resistivities measured relate to increasingly deeper layers. It is therefore of interest from the practical, geological, and industrial points of view to be able to measure and analyse the magneto-telluric variations.

If it is desired to effect magneto-telluric prospecting, it is therefore in short necessary to be able to determine for each period considered separately in the magneto-telluric spectrum:

(1) The ratio $E/H$ of the respective amplitudes of the variations of the electric field $E$ and of the magnetic field $H$;

(2) The phase displacement of the telluric variations in relation to the magnetic variations.

In order to attain this result the prospector must in practice make use of a pickup to measure or record simultaneous variations of a horizontal component of the electric field and of the horizontal component of the magnetic field perpendicular thereto.

The electric pickup may be of the simplest type, and it is sufficient to use what is called a telluric line; two electrodes are inserted in the ground, for example a few hundred metres from one another, and connected by insulated cables to the terminals of the measuring or recording instrument (galvanometer, electrometer, electronic amplifier, or the like). In current technique there is at present available a large choice of magnetic pickups, or in other words of magnetometers or magnetographs. Mention will be made for example of magnetic balances or variometers comprising a movable magnet supported by a balance knife or a quartz wire, magnetometers in which the moving magnet is suspended from a vertical torsion wire, windings in which an electromotive force is induced by the variation of the magnetic flux passing through them, which windings may contain a core of high magnetic permeability intended to increase sensitivity and sometimes being advantageously associated with a flux meter. In this connection mention may also be made of devices based on Hall effect. Fairly recently various types of nuclear precession magnetometers have also appeared on the market.

The telluric line as described above makes it possible to obtain without difficulty very faithful recordings of the variation of the electric field $E$ for all the periods $T$ which it is required to take into consideration. In practice the telluric recording nevertheless does not translate with absolute strictness and fidelity the variations of the field $E$, but by simple calibration of the apparatus it is easy to take into account any small imperfections and distortions affecting the amplitudes and phases.

It is also possible with the air of a suitable pickup to obtain a faithful or very substantially faithful recording of magnetic variations in a given large or small range of periods; for example, precession magnetometers make it possible to follow closely the variations of the magnetic field $H$ from the shortest periods useful to the prospector to the slowest variations. In consequence of their mechanical inertia, moving magnet magnetometers cannot follow excessively rapid variations of the magnetic field $H$, and it is scarcely possible to contemplate their use when the periods $T$ become less than a few seconds. Nevertheless, for longer periods these instruments also make it possible to obtain faithful recordings of magnetic variation.

A winding with or without a core can also supply a faithful recording, if not of the magnetic field, at least of its derivative in relation to time, provided that it has only a rather small number of turns. It should moreover be observed that it is immaterial whether it is the field or its derivative which is recorded, since the amplitude and phase relations between a sinusoidal magnitude and its derivative are known a priori.

In the selection of a magnetic pickup for the case considered, it is essentially necessary to take into account the fact that the order of magnitude of the amplitude of the variations of the magnetic field becomes very small in the range of short periods, equal to or less than 1 second. The prospector however is obliged to extend his measurements to the period range of 0.01 second in which natural amplitudes do not usually exceed 0.01 gamma. In this range of periods of very particular geological importance, the situation is therefore that, in the present state of the technique, most types of pickup have far too low sensitivity. Induction pickups then become inevitable, and it is necessary to endow them with sufficient sensitivity by the adoption of a very large number of turns of relatively fine wire, whether or not wound on a core of high magnetic permeability. With a winding of this type the self-induction is enormous and the natural capacities of the windings are far from negligible; resonance effects in the coil assume great importance. It may even be necessary to add external elements for example capacitors in order to create resonance effects favourable to an increase of sensitivity in certain regions of the spectrum.

From the foregoing it is clear that practical requirements, namely the need to have available sufficient sensitivity and to have no distortion in the recording, are contradictory. As the need for sensitivity takes precedence over all other considerations, it is necessary to be contented with recordings which are very unfaithful, that is to say which distort profoundly and in a complicated manner the amplitudes and phases. In theory it is certainly always possible to effect previous calibration of the magnetic apparatus in respect of amplitude and phase, in dependence on the period. It is clear, however, that if the distortions of the input signal are very pronounced, this will result in great inaccuracy in the final result, particularly as dynamic calibrations are involved in which the apparatus functions under conditions fairly different from those imposed by nature and by the order of magnitude of the phenomenon.

Having regard to the interest aroused by magneto-telluric prospection and with a view to overcoming the major disadvantages mentioned above, the idea was conceived, and constitutes the basis of the invention, to introduce into at least one of the magnetic or telluric chains additional distortions selected in such a manner as to make accessible, in a simple manner in dependence on the period T, on the one hand the phase displacement existing between the energising magnetic and telluric signals penetrating respectively into each recording chain, and on the other hand the ratio of the amplitudes of said signals.

For this purpose a measuring device according to the present invention comprises essentially an arrangement generating supplementary distortions which is inserted in at least one of the two chains, namely either the magnetic or the telluric chain, this arrangement being so selected that the two energising signals finally undergo, between the input and the output of their respective chain, an identical or practically identical distortion and that consequently the phase displacements in dependence on the period T under consideration which exist between the output signals will be identical or in a very simple ratio to the phase displacements existing between the energising signals, and also so that the ratio of the amplitudes (considered as a function of the period T) of the output signals will be identical or in a very simple relation to the ratio of the amplitudes of the input signals.

According to the invention, the arrangement generating supplementary distortions may advantageously be constituted by a coil not subject to the effects of the external magnetic fields and wound on a closed magnetic circuit, the two input terminals of which are connected to the lines of the measuring electrodes and the two output terminals of which, between which an adjustable capacitor is mounted, are connected to the terminals of the amplifier of the known measuring device.

A capacitor the capacity of which is determined as indicated hereinbelow may be connected in series with the winding of the coil.

The device generating supplementary distortions, which may be preceded by voltage amplification or power amplification, may according to an advantageous embodiment of the invention be constituted by a first element comprising two coaxial coils on an air core, protected by suitable screening from the action of outside magnetic fields, the ends of the first coil constituting the two input terminals of the apparatus and being connected to the terminals of the power amplifier, while the ends of the second coil constitute the two output terminals of the apparatus and are connected to the two input terminals of a second element constructed like the generator arrangement which has just been defined.

In the description below, which is given with reference to the accompanying drawings in which similar reference numerals are applied to similar provisions throughout, there are first explained the arrangement and operation of known measuring devices, followed by a description of the arrangement and operation of two preferred exemplified embodiments of the invention, in the field of magneto-telluric prospecting.

Figure 1:
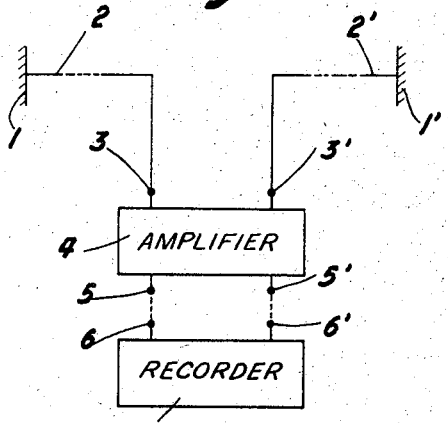
FIGURE 1 illustrates diagrammatically a conventional telluric recording chain.

In FIGURE 1 the terminal electrodes 1 and 1' of the telluric chain can be seen. The insulated conductor wires 2 and 2' connect the electrodes 1 and 1' respectively to the terminals 3 and 3' of the amplifier device 4 of suitable known type. This amplifier device 4 is provided with output terminals 5 and 5' connected respectively to the input terminals 6 and 6' of any known recording system 7, which may be of the graphic, photographic, magnetic tape, or other type.

Figure 2:
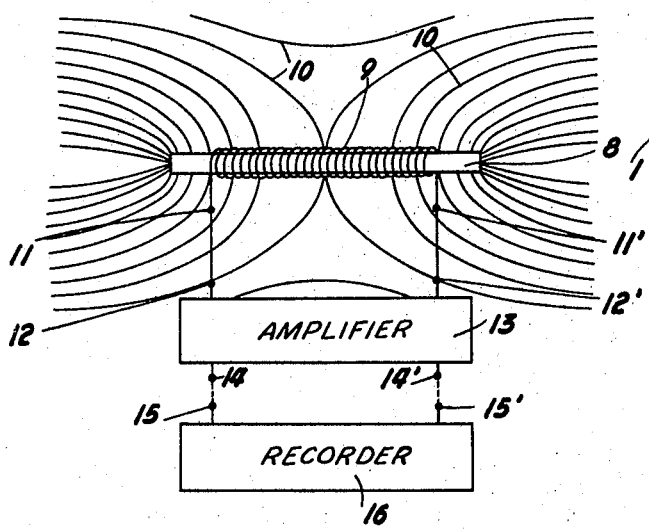
FIGURE 2 shows a diagram of a chain recording the variations of the magnetic field.

In FIGURE 2 a chain recording the variations of magnetic field is illustrated. This chain comprises a magnetic pickup, an amplifier, and a recorder connected together in that order. The magnetic pickup is constituted by a metallic core 8 of high magnetic permeabiilty on which there is accommodated a winding 9 having a large number of mutually insulated turns; the drawing shows the lines of magnetic force 10 diverted and concentrated by the core 8 because of its high permeability. The output terminals 11 and 11' of the winding 9 are connected respectively to the input terminals 12 and 12' of an amplifier device 13 of any known type, the output terminals 14 and 14' of which are in turn connected to the inputs 15 and 15' of a recording system 16 of known type.

Figure 3:
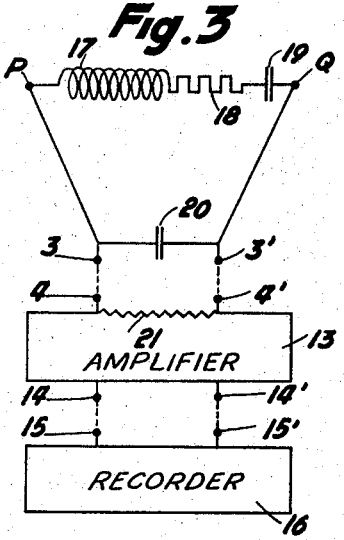
FIGURE 3 shows diagrammatically the electric circuit constituting the chain recording variations of the magnetic field.

It is interesting to recall how the electric circuit of the magnetic recording chain, as illustrated in FIGURE 2, is constituted more conventionally. In FIGURE 3, P and Q indicate respectively the physical ends of the winding 8 of the magnetic pickup; this winding may then be broken down as follows: in series between P and Q, 17 symbolises the coefficient of self-induction having the value L, 18 symbolises the resistance having the value R, of the pickup winding, 19 symbolises a capacity of the value $C_1$ interposed in the winding and having the object of effecting the elimination of relatively long periods in the recording of the phenomenon. The value of $C_1$ may obviously be infinite, if such filtration is not of interest. In parallel with the self-induction 17, resistance 18 and capacity 19, there has been symbolised a capacity 20 having the value $C_2$ and which is either the distributive capacity of the winding or this capacity plus a capacity added for the purpose of filtration if required. In addition the input impedance 21 of the amplifier 13 has been indicated. The value of this impedance, which may be likened to a pure resistance, is $Re$. In FIGURE 3 the various terminals, the amplifier, and the recorder illustrated in FIGURE 2 are found again.

It will now be assumed that the recording of the variations of the magnetic field is effected by the device described with reference to FIGURES 2 and 3, and this being the case the composition of a telluric recording chain equipped in accordance with the present invention will now be described with reference to FIGURES 4 and 5.

Figure 4:
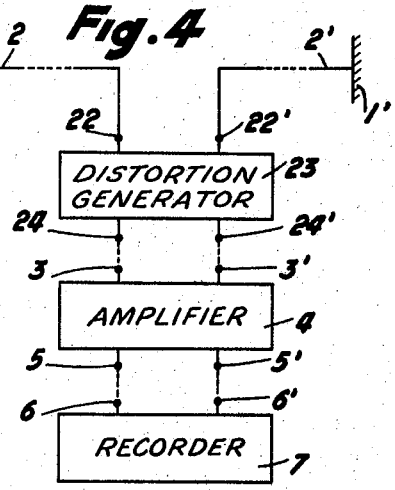
FIGURE 4 illustrates the principle of a telluric recording chain according to the invention.

In FIGURE 4 the electrodes 1 and 1' of the telluric line can be seen together with the insulated conductor wires 2–2' which connect said electrodes to the input terminals 22–22' of the generator 23 of supplementary distortions provided in accordance with the invention, and the output terminals 24–24' of which are connected respectively to the input terminals 3–3' of the amplifier 4 of the telluric chain; by its output terminals 5–5' the amplifier 4 is connected to the input terminals 6–6' of the recording system 7.

Figure 5:
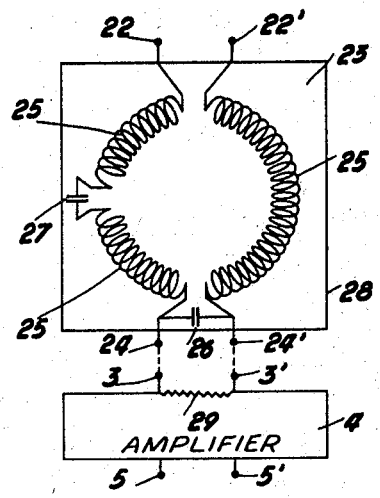
FIGURE 5 illustrates one form of practical embodiment of an element as illustrated in FIGURE 4.

FIGURE 5 illustrates in detail the distortion generator device 23 shown in FIGURE 4. The device is composed of a coil 25 wound on a closed magnetic circuit. A capacitor 26 is mounted in parallel on the coil 25 between the output lines of the coil 25 leading to the terminals 24–24'. A second capacitor 27 is connected in series on the winding of the coil 25. The whole assembly 23 is accommodated in magnetic screening 28 intended to avoid the parasitic effects of the induction due to variations of the external magnetic field on the electric circuit developed between the terminals 22–22' on the one hand and 24–24' on the other hand. FIGURE 5 also shows the input impedance 29 of the amplifier 4 illustrated in FIGURE 4.

The elements of the supplementary distortion generator 23, the amplifier 4, and the recorders 16 (FIGURES 2 and 3) and 7 (FIGURE 4) are determined as follows, utilising once again the notations used in connection with the magnetic recording chain illustrated in FIGURES 2 and 3. If K is any numerical coefficient, the coefficient of self-induction of the coil 25 is equal to KL and its resistance, which includes on the one hand the resistance existing between the electrodes 1–1' and on the other hand that of the wires 2–2', is equal to KR. The capacitor 26 receives a capacity $C_2/K$, $C_2$ being the capacity of the capacitor 20 situated in FIGURE 3 in parallel with the self-induction L 17, the resistance R 18, and the capacity $C_1$ 19. Similarly, the capacitor 27 receives a capacity $C_1/K$, $C_1$ being the value of the capacity of the capacitor 19 in series with the self-induction L 17 and the resistance R 18 of FIGURE 3. The value of the input impedance 29 of the amplifier 4 is taken to be equal to K $Re$. In addition, the amplifier 4 is arranged in such a manner that, leaving aside the input impedance 29, the amplifier 13 (FIGURES 2 and 3) on the one hand, and the amplifier 4 (FIGURES 4 and 5) on the other hand have the same transfer functions and are subject to the same regulations. Similarly, the recorder 16 (FIGURES 2 and 3) and the recorder 7 (FIGURE 4) are selected to be identical and subject to the same regulations.

It has been recalled above that the profound distortions of amplitudes and phases which affect the entire magnetic recording chain between the natural input signal and the recorded output signal are determined by the various elements constituting the chain and are complicated functions of the period T. The distortions originating from the telluric recording chain are in turn also more or less complicated functions of T, and these telluric distortions have a priori no simple relation with the magnetic distortions unless special steps are taken to remedy this. Precisely with the aid of the means which have just been described the present invention makes it possible to cause the distortions in question to come into a simple relation with one another in such a manner that, separately for each period T considered, the magnetic and telluric distortions become, if not identical, at least in a simple relation to one another, and that it is possible to deduce simply, rapidly and reliably from the data recorded at the output of the two chains the ratio $E/H$ and the difference in phase between the natural signals at the input. It will be seen immediately that in the embodiment described in detail with reference to the figures, the ratio of amplitude of the telluric field to that of the magnetic field is multiplied by $a.T$ when passing from the natural input signal to the recorded output signal, $a$ designating a numerical constant which is independent of T but depends solely on the elements constituting the two chains. The value of this constant may be calculated by means of the formula:

$$a = mNS/2\pi l$$

in which $m$ is the apparent permeability of the core of the coil picking up the variations of the magnetic field, N is the number of turns of said coils, S is the surface of the mean turn of this coil and $l$ is the distance separating the terminal electrodes of the telluric line. It should be observed that it is possible to determine the value of the constant $a$ by simple calibration; the calibration may make it appear that $a$ is not strictly constant but differs very slightly from a constant. This has not effect on the advantages gained in accordance with the invention, because it is sufficient to make, when required, a very small correction to the rough determinations. Similarly, in the mode of application described above by way of non-limitative example the advance in phase of the natural telluric field E in relation to the magnetic field H is increased simply by $\tau/2$ when considering the recorded output signals. Calibration may make it appear that this modification of the phase is not strictly constant, but such calibration is simple and the additional correction which it permits to the measurements is in any case accurate.

It will be seen that, independently of the fact that it makes it possible to utilise very smiplified expressions in connection with the dephasing and amplitude ratios, the present invention makes it possible to avoid direct amagnetic calibration, which is difficult, complicated, and can never be effected with the actual orders of magnitude of the magnetic variations which are to be measured. The invention requires only measurements relating to the coefficient of self-induction and apparent permeability, the mean surface of the turn of the magnetic pickup, the number of turns of the latter, the distance separating the electrodes of the telluric line, and the period of the phenomenon.

It should be pointed out that the problem is further simplified in cases where the magnetic pickup used is a coil comprising turns of a relatively large diameter, which makes it possible to avoid the use of a metallic core of high magnetic permeability; in this case the apparent permeability is equal to 1 by definition. The simplifications and the accuracy thus obtained are indicated by means of the following example.

For the purpose of picking up the variations of the terrestrain magnetic field use was made of a coil of 153,000 circular turns, the diameter of the mean turn being 52 cm., the total weight of this magnetic pickup, including the casing, being about 250 kilograms. This pickup was connected to the terminals of a recording chain of the type described above.

The distortion generator device constructed in accordance with the invention has the following form:

A winding of about 42,000 turns, wound on a closed magnetic circuit of a section of 5.65 square cm. and a mean length of 23 cm. For the metal of the magnetic circuit use was made of "anhyster";

The assembly formed by the winding and the closed magnetic circuit was protected by a double box of mu metal the external dimensions of which are 19 cm./19 cm./15 cm. The weight of the assembly was 4.7 kilograms.

Having regard to the voltage involved and the order of magnitude of the self-inductions concerned, the self-induction and the resistance of the distortion generator can be very accurately adjusted so that they will be practically identical to those of the coil serving as magnetic pickup.

It was possible to tune the magnetic pickup to a frequency given by the presence of a determined capacity connected in parallel between its output terminals. A capacity identical to the preceding one was then disposed between the output terminals of the distortion generator. As the distortion generator was used in accordance with the invention and inserted in a recording chain identical to the recording chain which was situated at the terminals of the magnetic pickup, the value of the constant $a$ was equal to $NS/2\pi l$.

In thees circumstances the errors on N are lower than $\frac{1}{100}$ in the most unfavourable cases; similarly the errors on S are at worst equal to $\frac{1}{100}$. With regard to the errors in $l$, arrangements can be made to ensure that these do not exceed $\frac{1}{100}$.

Finally, the phase advance of the telluric field E in relation to the magnetic field H is similarly actually increased only by $\pi/2$ when the recorded output signals are considered.

In the above example it is naturally possible to insert a capacitor in series on the one hand on the coil serving as magnetic pickup and on the other hand on the distortion generator in order to eliminate the relatively long periods in the case of the magneitc pickup, and in the case of the distortion generator to eliminate the relatively long periods and the direct current voltage. The apparatus used then in fact provides on the telluric recording chain filtration which makes it possible to eliminate any direct current voltage established between the electrodes of the telluric line. This makes it unnecessary to utilise additional devices, because the elimination of the voltage is necessary for good recording. This is a third advantage of the invention, although it is less important than those previously mentioned.

With regard to the second exemplified embodiment, it will again be assumed that the recording of the variations of magnetic field is effected by the arrangement described in connection with FIGURES 2 and 3, and in these circumstances there will now be described, with reference to FIGURES 6 and 7, the composition of an alternative telluric recording chain equipped in accordance with the present invention.

Figure 6:
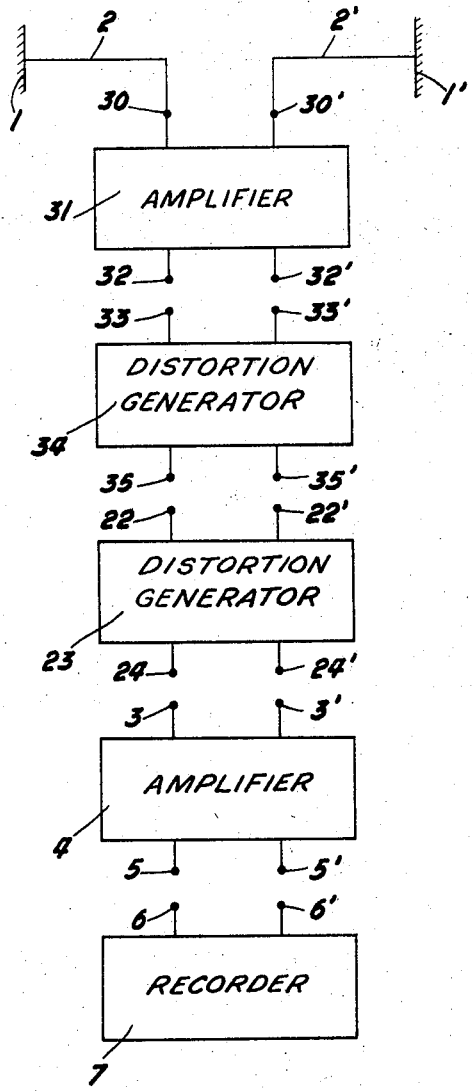
FIGURE 6 illustrates the principle of a second telluric recording chain according to the invention.

In FIGURE 6 the electrodes 1 and 1' of the telluric line can be seen together with the insulated conductor wires 2 and 2' which connect said electrodes to the terminals 30 and 30' of the amplifier device 31 of known type and constituted for example of a voltage amplifier stage followed by a suitable power amplifier stage. The output terminals 32 and 32' of the amplifier 31 are connected to the input terminals 33 and 33' of a first element 34 of the additional distortion generator provided in accordance with the invention and described hereinbelow. The output terminals 35 and 35' of the element 34 are connected respectively to the input terminals 22 and 22' of the second element 23 of the supplementary distortion generator. The output terminals 24 and 24' of the element 23 are connected respectively to the input terminals 3 and 3' of the amplifier 4 of the telluric chain; by its output terminals 5 and 5' the amplifier 4 is connected to the input terminals 6 and 6' of the recording system 7.

Figure 7:
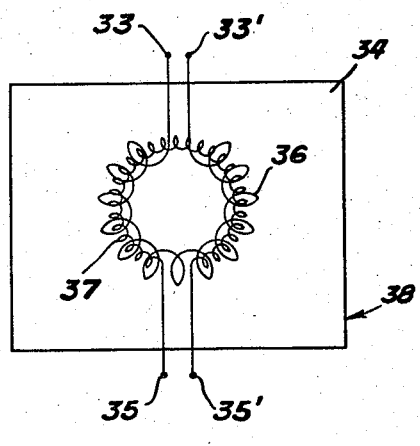
FIGURE 7 illustrates one example of practical embodiment of an element of the type illustrated in FIGURE 6.

FIGURE 7 illustrates in detail the device 34 constituting the first element 34 of the distortion generator. The device is composed of a first coil 36 the two ends of which are connected to the terminals 33 and 33'. This coil 36 is characterised by a coefficient of self-induction $L_1$ and a resistance $R_1$. The element 34 comprises a second coil 37 coaxial to the coil 36. This coil 36 has a coefficient of self-induction $L_2$, a resistance $R_2$, and its two ends are connected to the output terminals 35 and 35'.

The coils 36 and 37 are wound on an air core. Between the coils 36 and 37 there is a coefficient of mutual induction M. In order to avoid parasitic induction effects due to the variations of the external magnetic field, magnetic screening 38 is provided which is so constructed that its presence does not affect the values of the self-inductions $L_1$, $L_2$ and of the mutual induction M.

The constitution of the second element 23 of the distortion generator is strictly identical to that of the distortion generator 23 described above in connection with FIGURE 5; the same is true of the amplifier 4 and of the recorders 16 (FIGURES 2 and 3) and 7 (FIGURE 4). These different elements are here determined in identical manner to that explained in connection with the first example given above of the application of the invention; however, in the present case it is the sum of the resistance of the coil 25 and of the resistance of the coil 37 which is equal to KR and the sum of the self-induction of the coil 25 and of the self-induction of the coil 37 which is equal to KL, L and R being symbolised respectively by 17 and 18 in FIGURE 3.

The coils 37 and 36 are so constructed that, after passing into the amplifier 31 and into the coil 36, the telluric energising signal creates in the coil 37 an energisation which, for the band of frequency of concern to the user, will be proportional to within one hundredth for example to the derivative of the electric field in relation to time. It will be seen immediately that in the present exemplified embodiment (FIGURES 6 and 7) the ratio of the amplitudes of the telluric field to the magnetic field is multiplied by a constant $b$ when passing from the natural input signal to the recorded output signal. The numerical constant $b$ is independent of T but depends solely on the constitutative elements of the two chains. The value of this constant is expressed by the formula:

$$b = mNSR_1/MlP$$

in which $m$, N, S, and $l$ have the same meaning as in the first exemplified embodiment of the invention, and in which $R_1$ is the resistance of the coil 36, M the mutual induction between the coils 36 and 37, and P the coefficient of amplification applied to the first stage of the amplifier 31.

It should be observed that it is here possible to determine the constant $b$ by simple calibration; the calibration may make it appear that $b$ is not strictly constant but differs very slightly from a constant. This has no influence on the advantages obtained according to the invention, because it is then sufficient if necessary to make a small correction to the rough determinations. Similarly, in this second form of application of the invention the phase displacement existing between the natural electric field E and the magnetic field H remains constant when the recorded output signals are considered, and is therefore no longer tied to the value of the period.

All the advantages explained above with regard to the first embodiment of the invention are therefore obtained once again in this case, while others are added. The advantages inherent to the present example, both with regard to the amplitude ratios and with regard to the phase displacements, are in fact generally applicable to the output signals which correspond to the transient response times of the two recording chains when the level of the phenomenon varies abruptly. This fact permits very great selectivity in the analysis of the natural phenomena without introducing errors in the calculation of the amplitude ratios and the measurement of phase displacements; it then becomes possible to introduce into these calculations, not the measurements made amplitude by amplitude, but defined integrals of the voltages of the output signals in dependence on time, this applying to a given interval of time and a given period. The values of the ratios $E/H$ and of the phase displacements are then established on statistic measurements, thus permitting increased rapidity and reliability in the utilisation of the result of the measurements.

In addition, the arrangement according to the second example (FIGURES 6 and 7) not only makes it possible to eliminate completely any telluric direct voltage, however strong this may be, but it also makes it possible to eliminate any voltage deriving continuously, to the extent to which use is made for example of the capacitors 27 and 19.

Moreover, it is known that for periods greater than 1 second the modulus of the natural electric field increases with the period. That is why, because the output signals of the telluric recording chain no longer depend on the variations of the telluric field but depend on the variation of the derivative of said telluric field in relation to time, the voltage obtained in the recording apparatuses of the telluric channel are, for a given adjustment, approximately constant in this region of the spectrum; easier and more effective filtration of the different periods of interest to the prospector is therefore possible in this manner.

In the following practical example use has been made of the magnetic pickup of the first numerical example and, as second element of the distortion generator, the distortion generator utilised in the same example; the first element of the distortion generator was then in the following form:

The coil 36 was a cylindrical coil comprising 1050 turns of wire of a diameter of 0.25 mm. Its outside diameter was 9.25 cm. and its length 2 cm.

The bobbin 37 of cylindrical shape and coaxial with the first-mentioned coil had an outside diameter of 7 cm., 36,000 turns of 7/100 wire, and a length of 2 cm. The coefficient of mutual induction was then 1.27 Henry. The weight of the two coils, including frames, was about 500 grams. The assembly formed by these two coils was housed in a box of mu metal, the outside dimensions of which were 36 cm. x 36 cm. x 14 cm.

For periods smaller than 1 second the electric field was derived at least to within 1/100. The values of $R_1$, M, and P could easily be determined to within 1/100. It was thus possible in a very satisfactory manner to make use of the advantages mentioned for this second embodiment.

What I claim is:

1. In a method of geophysical exploration of the underground in a given area, the steps of detecting over a given period of time, varying values dependent upon and representing variations occurring in the electric telluric field in said area, simultaneously detecting over the same period of time, time varying values dependent upon and representing variations occurring in the magnetic field of the earth in said area, one of said steps of detecting producing, in the corresponding detected time varying values, a first distortion factor inherently resulting from said one step of detecting, distorting the values detected in at least one of said steps of detecting by a second distortion factor approximating the first distortion factor inherently resulting in said one of said steps of detecting, and recording the detected values of both said steps of detecting and including the changes therein made by both said distortion factors for the comparison of both said detected values.

2. The method according to claim 1 wherein said step of distorting by a second distortion factor comprises distorting the amplitude and phase of values detected in one of said steps of detecting by substantially the same amplitude and phase distortion inherently occurring in the remaining step of detecting, whereby, upon said step of recording, the amplitude and phase relationship of values detected in both said steps of detecting are more simply related and more easily determined.

3. The method according to claim 2 wherein said step of distorting by a second distortion factor further comprises distorting the time varying values representing variations in the electric telluric field in said area by distortion substantially the same as distortion occurring inherently in the detecting of the time varying values representing variations in the magnetic field of the earth in said area.

4. In a method of geophysical exploration of the underground in a given area, the steps of detecting telluric electric field variations in said area and producing a first varying electrical signal representative of the telluric electric field variations in said area, simultaneously detecting variations in the magnetic field of the earth in said area and producing a second varying electrical signal representative of the variations in the magnetic field of the earth in said area, one of said steps of detecting producing, in the corresponding varying electrical signal, a first distortion inherently resulting from said one step of detecting, distorting one of the first and second varying electrical signals by a second distortion to cause substantially the same distortion in both said first and second varying electrical signals and recording both the first and second varying electrical signals, including distortions produced by both said first and second distortions, for a comparison of both said varying electrical signals.

5. The method according to claim 4 wherein the step of producing a second varying electrical signal comprises providing a first inductive coil and establishing a signal across the first inductive coil in response to the magnetic field of the earth in said area and said step of distorting one of the first and second varying electrical signals by a second distortion comprises providing a second inductive coil having the same distorting characteristics as the first coil and applying the first electrically varying signal across the second inductive coil to distort the first signal similarly to the distortion of the second signal.

6. Apparatus for use in the exploration of the underground in a given area comprising fist pickup means responsive to the telluric electric field in said area for producing a first varying electrical signal, second pickup means responsive to the magnetic field of the earth in said area for producing a second varying electrical signal, one of said first and second pickup means including means inherently producing distortion in the corresponding produced varying electrical signal, means for producing a further distortion for distorting one of said first and second varying electrical signals to provide substantially similar distortions in said first and second varying electrical signals and recording means for recording both said first and second varying electrical signals including the distortions produced for a comparison of said first and second varying electrical signals.

7. The apparatus according to claim 6 wherein said one of said first and second pickup means including means inherently producing distortion provides an inherent distortion in the relationship between the field detected by said pickup means and the varying electrical signal produced thereby, said means for producing a further distortion being electrically connected to the remaining of said first and second pickup means for distorting the remaining of said first and second varying electrical signals by a distortion having characteristics closely similar to the characteristics of said inherent distortion.

8. The apparatus according to claim 7 wherein said means inherently producing distortion of said one of said first and second pickup means produces amplitude and phase distortion in the varying electrical signals produced by said one of said first and second pickup means, said means for producing a further distortion comprising means for producing amplitude and phase distortion of substantially the same characteristics as the distortion produced by said inherent distortion producing means, whereby, upon recording by said recording means, the amplitude and phase relationships of said first and second varying electrical signals are more easily determined.

9. The apparatus according to claim 7 wherein said second pickup means comprises a first inductive coil means for production of said second varying electrical signal in response to the magnetic field of the earth in said area, said means inherently producing distortion including said first inductive coil means, said means for producing a further distortion comprising second inductive coil means electrically connected to said first pickup means for producing a distortion in the first varying electrical signal similar to the distortion in the second signal.

10. Apparatus according to claim 9 wherein said second inductive coil means comprises a screened coil wound upon a closed magnetic circuit having input terminals electrically connected across the output of said first pickup means and having capacitively connected output terminals across which distorted output signals are produced.

11. Apparatus according to claim 9 wherein said means for producing a further distortion further comprises, in addition to said second inductive coil means, two screened coaxially wound coils having input terminals connected to one of said coaxially wound coils and output terminals connected to the remaining coaxially wound coil, said coaxially wound coils being electrically connected between said first pickup means and said second inductive coil means.

12. The method of detecting, recording and comparing interrelated variables comprising the steps of detecting over a given period of time, time varying values dependent upon and representing variations occurring in a first of the interrelated variables, simultaneously detecting over the same period of time, time varying values dependent upon and representing variations in a second of the interrelated variables, one of said steps of detecting producing, in the corresponding detected time varying values, a first distortion factor inherently resulting from said one step of detecting, distorting the values detected in at least one of the steps of detecting by a second distortion factor approximating the first distortion factor inherently resulting in said one of said steps of detecting, and recording the detected values of both said steps of detecting including the changes therein made by both said distortion factors for the comparison of both said detected values.

13. The method according to claim 12 wherein said step of distorting by a second distortion factor further comprises distorting the time varying values representing variations in the second of said interrelated variables by a distortion substantially the same as the distortion occurring inherently in the step of detecting values representing variations in the first of the interrelated variables.

References Cited

UNITED STATES PATENTS 2,677,801    5/1954    Cagniard _____ 324—8 X
2,177,346   10/1939    Saibara et al. _____ 324—1

RUDOLPH V. ROLENEC, *Primary Examiner.*

G. R. STRECKER, *Assistant Examiner.*

U.S. Cl. X.R.

324—8